(No Model.) 2 Sheets—Sheet 1.

W. L. CARD.
SEPARATOR.

No. 359,498. Patented Mar. 15, 1887.

Witnesses
Edwin S. Clarkson
G. A. Tauberschmidt

Inventor
William L. Card
By his Attorney F. W. Ritter Jr.

(No Model.) 2 Sheets—Sheet 2.
W. L. CARD.
SEPARATOR.
No. 359,498. Patented Mar. 15, 1887.
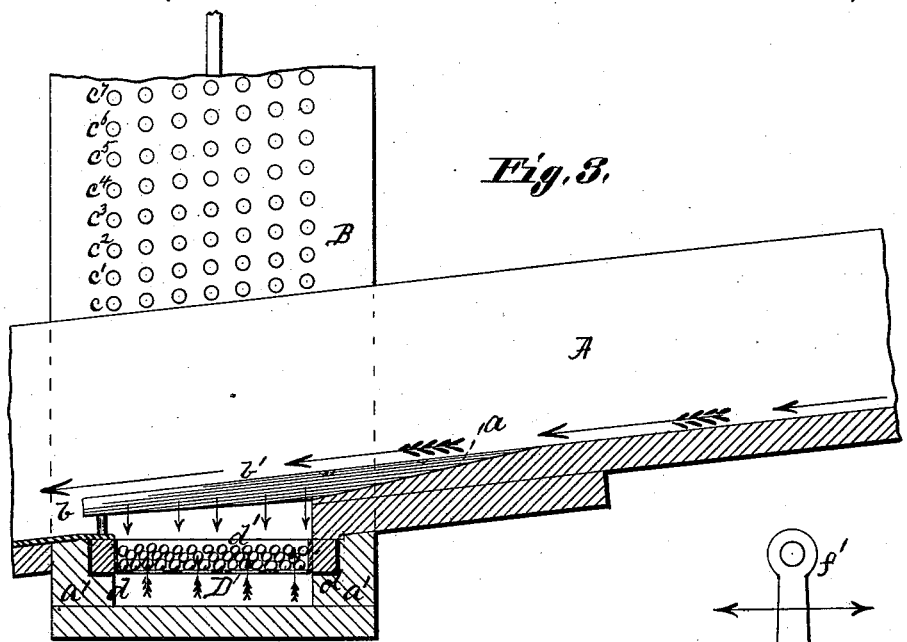
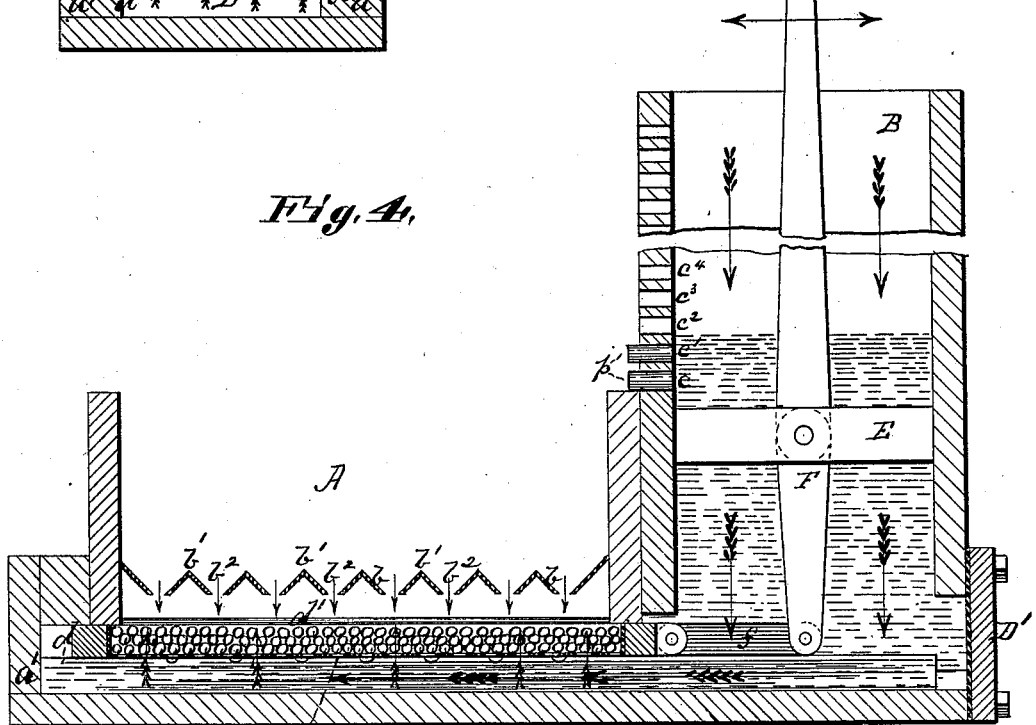
Witnesses
Edwin S. Clarkson
J. A. Faubenschmidt
Inventor
William L. Card
By his Attorney F. W. Ritter

UNITED STATES PATENT OFFICE.

WILLIAM L. CARD, OF LA CROSSE, WISCONSIN, ASSIGNOR TO THE TIERRA SECA MINING COMPANY, OF ST. LOUIS, MISSOURI.

SEPARATOR.

SPECIFICATION forming part of Letters Patent No. 359,498, dated March 15, 1887.

Application filed July 22, 1886. Serial No. 208,799. (No model.)

*To all whom it may concern:*

Be it known that I, WILLIAM L. CARD, a citizen of the United States, residing at La Crosse, in the county of La Crosse and State of Wisconsin, have invented certain new and useful Improvements in Separators for Eliminating Precious Metals from their Matrices; and I hereby declare the following to be a full, clear, and exact description of the same, reference being had to the accompanying drawings, wherein—

Figure 1:
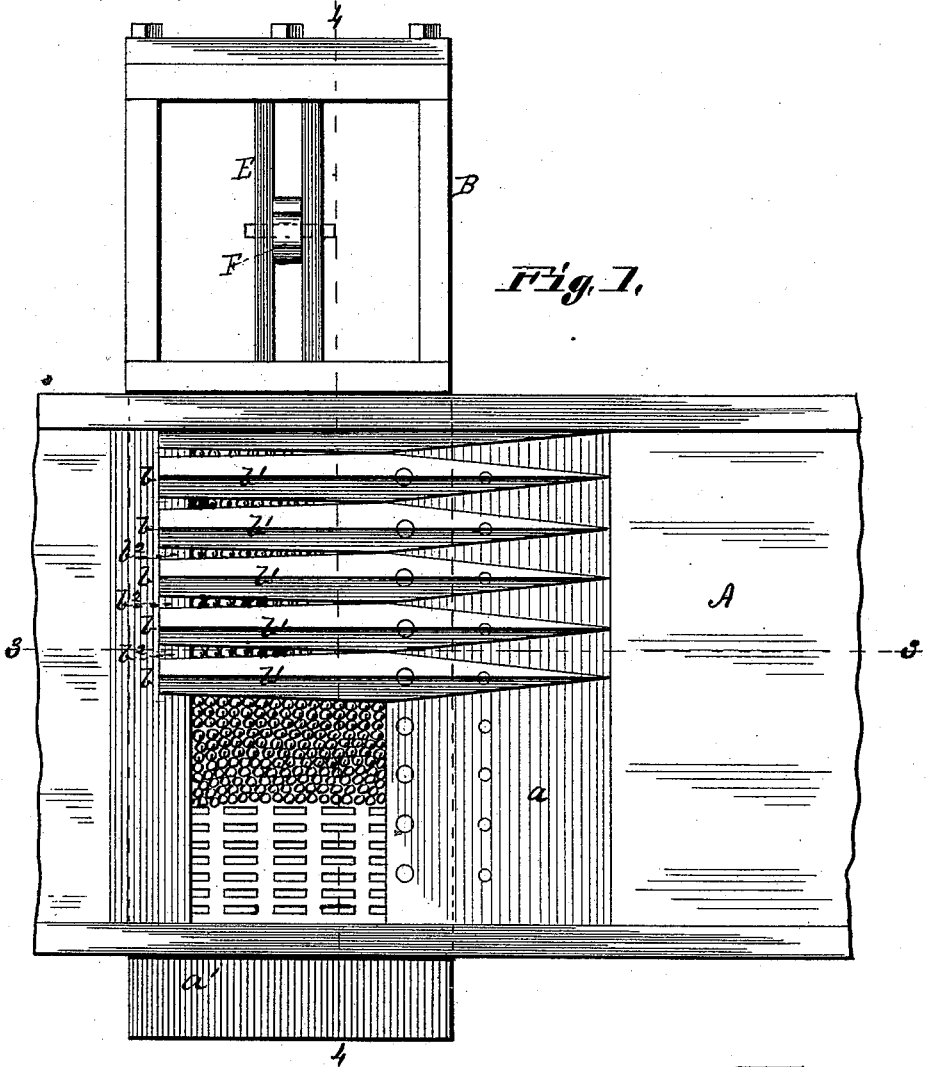
Figure 2:
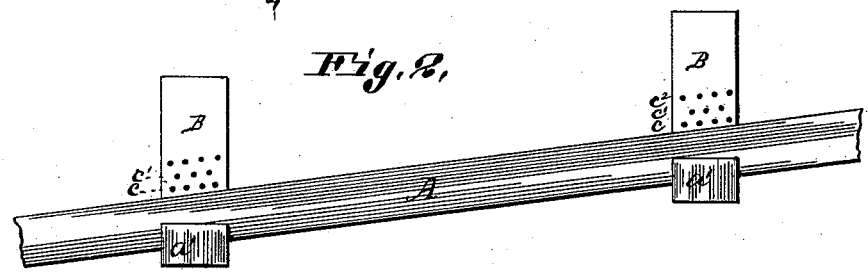

Figure 1 is an enlarged plan view of a portion of a sluice, showing a separator embodying my invention applied thereto, some of the screen-bars and shot having been removed to give a view of the perforated tray below. Fig. 2 is a reduced side elevation of a portion of a sluice, showing two separators and their water-columns combined therewith. Fig. 3 is a longitudinal vertical section of the sluice, &c., on the line 3 3, Fig. 1; and Fig. 4 is a transverse vertical section of the sluice, &c., on the line 4 4, Fig. 1.

Like letters refer to like parts wherever they occur.

My present invention relates to the construction of separators of that class wherein a permeable vibrating bed is employed in conjunction with a constant steady upflow of water, and has for its object a construction which shall be simple and inexpensive, and shall yet permit of a nice graduation as well as perfect control of the pressure of the upflowing water, whereby fine gold can be eliminated from matrices containing black sand and precipitated into a stratum beneath the material of the bed, so as to be comparatively free from black sand, all of which is very desirable in some regions where the percentage of black sand in the matrix is large, and is not sufficiently rich in gold to pay for its treatment after concentration.

While the main feature of the invention lies in the peculiar construction of the water-column which supplies the separator, there are minor features relating to the means for horizontally vibrating the permeable bed of the separator, which are of considerable importance.

I will now proceed to describe my invention more specifically, so that others skilled in the art to which it appertains may apply the invention.

In the drawings, A indicates a sluice of any of the well-known forms, in the bottom of which are openings corresponding in number with the number of separators it is desired to employ. The bottom of the sluice leading to said opening is cut away, or equivalent means employed to produce an incline, $a$, terminating in said opening. The opening is guarded by screen-bars $b$, of any suitable form, preferably of the character shown—that is to say, with sloping sides and crowning central ridge, $b'$, which will facilitate the passage of flake gold, tapering somewhat toward the tail of the screen to form gradually-widening slots or spaces, $b^2$, between the bars, and "pen-shaped," or cut diagonally, so as to fit upon the incline $a$, and form therewith converging gutters leading to the slots $b^2$, so as to insure all fine material which precipitates being swept into the separator. Below the opening in the sluice and secured to the bottom of the same is the separator-case $a'$, which in such cases may be an ordinary box of the width of the water-column desired, and may project on one side of the sluice to form the base of the water-column B.

B indicates the water-column of any desired height, or that which will give the greatest pressure or head of water required. In one side of it, preferably the side next to the sluice A, and in the lowest plane which will give the minimum pressure desired, is a slightly-inclined row of holes, $c$, and immediately above said row is another, $c'$, and so on up to the top of the column, or to any desired height, the lower hole of each succeeding row being slightly above the plane of the upper hole of the preceding row, so that by withdrawing the plugs from the proper hole or holes the height of the head of water and consequent pressure and flow of the water through the permeable bed can be regulated to any necessary degree.

Within the case $a'$, supported on suitable cleats or ways, $d$, is a perforated tray, D, which is filled with shot $d'$, or any similar granular mobile material of greater gravity than the matrix and less gravity than gold, (or the metal to be saved,) and in the end of said case or bottom of the water-column B is a door, D', to permit of the withdrawal of the tray D for "cleanng up," changing the size or grade of the mobile material or shot $d'$, or for any other desired purpose. It is intended that this tray D or bed of the separator shall be capable of horizontal vibration, and in order to accomplish this I arrange in the water-column B a cross-bar, E, or cross-bars, and pivot thereon a lever, F, connecting the lower end of said lever with the tray D by a link or short lever, $f$, while the upper end, $f'$, of said lever may be connected with the other levers, if a series of these separators are used in combination with a sluice. The tray D may fit loosely, so that the small amount of water which forces its way into the joint will keep out sand and facilitate the vibration of the tray. These levers may be operated by a water-wheel, which utilizes the water discharged at the tail of the sluice, as described in application Serial No. 208,798, filed of even date herewith, or in any other suitable way.

The machine, being constructed substantially as described, will operate as follows: Water from any suitable source being supplied to the water-column B and the placer earth allowed to flow over the screen-bars $b$, the plugs $p$ are gradually withdrawn or inserted, as the case may be, until a head or column of water is secured the pressure of which and its upward flow through the separator-bed is best adapted for the material under treatment. At the same time the lever F is set in motion and the tray vibrated to assist the precipitation of the gold through the strata of shot in the tray and preserve the permeability of the separator-bed.

It will be observed that among the advantages of a separator constructed as herein described are simplicity, durability, and cheapness, and the ability to treat the auriferous material by the upward flow of the water only, or by vibration conjointly with the upflow of water, and so perfectly regulate the upward force of the water which permeates the bed as to select exactly what is desired shall be stratified below the material of the bed, whereby all of the black sand can be rejected and allowed to pass off with the sluice-water.

Having thus set forth the nature, advantages, and operation of my invention, what I claim, and desire to secure by Letters Patent, is—

1. The combination, with the separator having a permeable bed, of a water-column having a series of holes arranged in inclined rows, substantially as and for the purposes specified.

2. In a separator, the combination of a vibrating permeable ore-bed and a water-column having a series of holes, $a$, arranged in inclined rows, substantially as and for the purposes specified.

3. The combination, with the separator having a sliding tray, of a water-column, a pivoted lever arranged therein, and a link which connects the lever and tray, substantially as and for the purposes specified.

In testimony whereof I affix my signature in presence of two witnesses this 21st day of July, 1886.

WILLIAM L. CARD.

Witnesses:
F. W. RITTER, Jr.,
EDWIN S. CLARKSON.